March 29, 1927.

BEST AVAILABLE COPY 1,622,635

E. L. FONSECA

ELECTRIC CONTROL DEVICE

Original Filed Aug. 6, 1925

INVENTOR
Edward L. Fonseca
BY
Pennie, Davis, Marvin, Edmonds
ATTORNEYS

Patented Mar. 29, 1927.

1,622,635

UNITED STATES PATENT OFFICE.

EDWARD L. FONSECA, OF NEWARK, NEW JERSEY, ASSIGNOR TO THE WILCOLATOR COMPANY, OF NEWARK, NEW JERSEY, A CORPORATION OF DELAWARE.

ELECTRIC CONTROL DEVICE.

Original application filed August 6, 1925, Serial No. 48,501. Divided and this application filed February 2, 1926. Serial No. 85,532.

This invention relates to electrical control devices of the type in which the supply of current to energy consuming apparatus is controlled by the action of an automatically operating switch, and has to do more particularly with a control device in which an electrical relay of improved form is used to actuate the main circuit breaker through the energy consuming apparatus. While the new control device is capable of wide application, it is particularly useful in connection with electric heating devices, the supply of current to which is to be regulated in accordance with lapse of time, or with the temperature to be maintained by the heating unit. The invention will, accordingly, be described in its use in connection with an electric heater which is to be operated to maintain a predetermined temperature, but it is to be understood that the utility of the invention is not restricted to such use, which is merely typical of a wide variety.

In electric heating devices, current is usually consumed in the resistor in large quantities and when a thermostatic switch, ordinarily of delicate construction, is employed to establish circuits controlling the main circuit closer, it is necessary that this thermostatic switch should be connected across the line in such manner that only small currents flow through it, so that as the switch points make and break, no burning of the points can occur. Similarly, the main circuit closer should be of the double break type, so that arcing is reduced, and it is also desirable that this circuit closer should be so arranged that no connection is made from a fixed terminal to a moving part, since this would require the use of heavy current-carrying pigtails, which are unsatisfactory for many obvious reasons.

The present control device affords the several advantages above pointed out and achieves the desired result by the use of a few simple circuits, together with an automatically operated switch and a solenoid-operated circuit closer of standard form. These circuits are so arranged that only a small fraction of the load current passes through the switch at any time, and the circuit closer is of the double break type but requires no connections between fixed and moving terminals.

In the new control device, as used in connection with an electric heater to be controlled to maintain a substantially constant temperature, a switch is used having a movable terminal brought into contact with one or the other of two fixed terminals under the control of a thermostatic device exposed to the temperature developed by the heater. When this temperature falls to a predetermined lower limit, the moving terminal is brought into contact with one of the fixed terminals, and thereupon a circuit is established through a solenoid and the main circuit closer through which current flows to the heater, is closed. When this action takes place a second circuit in series with the solenoid is established which acts to maintain the circuit closer closed, even though the first closing circuit is broken. Accordingly, as the movable arm of the switch is disengaged from the fixed terminal by the thermostat as the temperature rises, the circuit closer is maintained in closed position until the temperature has reached a predetermined upper limit, when the movable arm contacts with the second fixed terminal. Thereupon, the solenoid is short-circuited and the main circuit through the heater is interrupted.

By the arrangement outlined, the thermostatically actuated switch is protected against heavy currents, and the main circuit closer by its own closing establishes the circuit which maintains it closed without the use of auxiliary contacts for this maintaining circuit. In the devices heretofore used in which a solenoid, upon energization, establishes a maintaining circuit, such auxiliary contacts have been customarily used, and if these contacts get dirty or out of order, the solenoid is rapidly energized and de-energized and the parts become quickly worn.

For a better understanding of the invention reference may be made to the accompanying drawings, in which—

Figure 1:
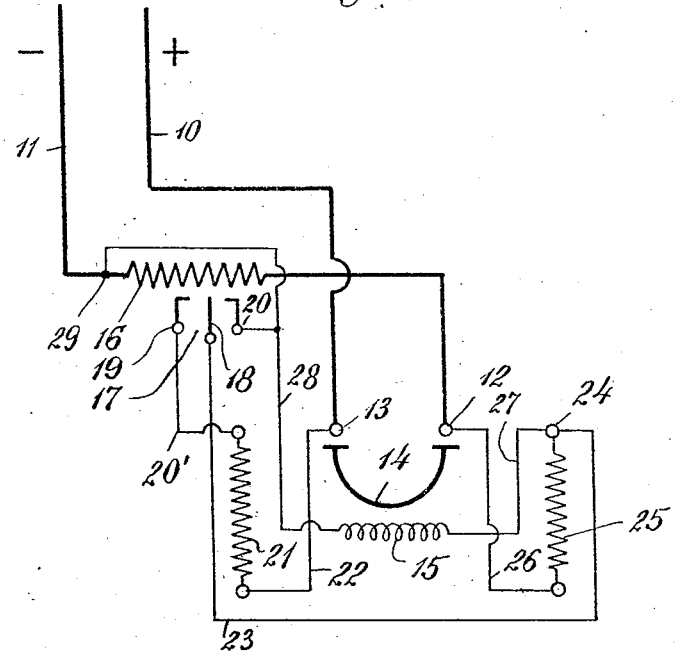
Fig. 1 is a circuit diagram used in one embodiment of the invention.

In these drawings, the line wires connected to a suitable source of current are designated 10, 11, these reference characters referring to the positive and negative line wires, respectively. It is to be understood that alternating current may be used with the device with equal facility, and the circuits for direct current are shown merely for purposes of illustration.

There wires lead to terminals 12 and 13, which in normal operation are bridged by the movable contact member 14. These parts together with a solenoid 15, constitute a circuit closer which may be any suitable commercial type. The contact member 14 is connected to the armature of the solenoid in the usual way and is biased toward open position by a suitable spring, so that when the solenoid is energized the circuit closer is closed, and when the solenoid is de-energized, the circuit closer is opened. Connected in the line 11 is the energy consuming apparatus 16, here illustrated conventionally as the resistor of an electric heater.

The operation of the apparatus 16 is controlled by a switch designated generally as 17, which may be automatically operated as may be desired. The control of electric heaters is usually exercised by a temperature responsive device, or a clock, and the switch 17 has a movable arm 18, moved in accordance with changes in temperature developed at the heater, or by lapse of time. For the purpose of this description, the movable arm 18 will be considered as actuated by a thermostatic device of any suitable or convenient form, numerous devices of this sort being commercially available. The switch 17 also has two fixed contacts 19 and 20, and the arm 18 is brought into contact with the contact 19 by the thermostat when the temperature reaches a fixed lower limit and with contact 20, when a fixed higher limit is reached. Between these limits, the arm 18 is free of both contacts.

The contact 19 is connected by wire 20' to a resistance 21, which is connected at its other end to circuit breaker terminal 13 through the wire 22. The movable arm 18 of the switch is connected by a wire 23 to one end 24 of a resistance 25, the other end of which is connected by a wire 26 to the circuit closer terminal 12. A wire 27 leads from point 24 to one end of the solenoid 15, the other end of which is connected by a wire 28 to a point 29 on the line 11 beyond the resistor 16.

With this arrangement, when the main switch (not shown) of the heater is closed, the temperature is lower than the predetermined lower limit and arm 18 has been moved by the thermostat into contact with the stationary terminal 19. Current from the line wire 10 now flows through contact 13, wire 22, resistance 21, wire 20', terminal 19, arm 18, wire 23, point 24, wire 27, solenoid 15, and wire 28 to point 29 on line wire 11. A small part of the current reaching point 24 also flows through resistance 25 to the contact 12, but the main current flow is through the solenoid 15. The energization of the solenoid at once causes the circuit closer to close, thus causing a flow of current through the resistor 16.

As soon as the main circuit is closed, the polarity of the resistance 25 is reversed and current flows through the solenoid, a part of which has passed through resistance 21 and switch 17 to point 24 and the solenoid, while another part has passed through point 12, wire 26 and resistance 25 to point 24 and the solenoid. This latter circuit is the maintaining circuit for the solenoid, and it is established by the closing of the main contacts of the circuit closer. The first circuit including resistance 21 is the circuit for closing the circuit closer and as more current is required to close the circuit closer than to maintain it closed, resistance 21 is smaller than resistance 25. In practice, I have found it desirable to make resistance 25 of 350 ohms, when resistance 21 is of 300 ohms.

As current flows through the heater, the temperature to which the thermostat is exposed, rises until the fixed lower limit is exceeded, whereupon the movable arm 18 moves away from the fixed terminal 19, thus breaking the circuit through resistance 21. The circuit closer remains closed, however, because current flowing through point 12, wire 26 and resistance 25 maintains the solenoid energized.

If the temperature reaches the predetermined upper limit, arm 18 comes into contact with terminal 20, and when this occurs a shunt around the solenoid is established from point 24 through wire 23, arm 18, contact 20 and wire 28 to the point 29. The solenoid is now deenergized and the spring of the circuit closer opens the line at the point 12 and 13. While the switch 17 is in this shunt, it is protected against excessive currents by the resistance 25. The switch is similarly protected by resistance 21, when arm 18 is in contact with terminal 19, so that no heavy current ever passes through the switch points. Once opened, the circuit closer continues in this condition until the temperature has fallen to the fixed lower limit when the cycle of operations commences again.

It will be observed that in the new device, the circuit by which the circuit closer is maintained in closed position, is established through the main circuit terminals. I am aware that it has been proposed to construct an electrical control device of this type actuated in accordance with temperature changes, in which the circuit for maintaining the circuit closer closed is established through auxiliary contacts closed by the armature of the circuit closer solenoid when the latter is energized and closes the circuit closer. This construction has the disadvantage that, since only a small current is used for maintaining purposes, any dirt on the auxiliary contacts will result in the de-energization of the solenoid and the opening of the main line. As the solenoid is energized through the maintaining circuit immediately after the temperature has exceeded the fixed lower limit, the breaking of the main circuit shortly after it has been closed will quickly cause a drop in temperature sufficient to bring about a re-establishment of the closing circuit and the cycle of operation of the moving parts will accordingly be rapidly repeated and these parts will quickly become worn. This disadvantage is avoided with the new construction.

Figure 2:
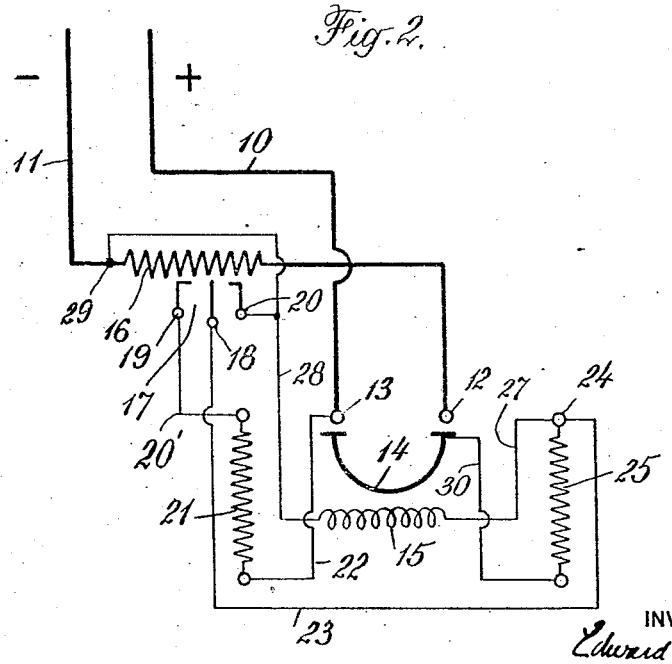
Fig. 2 is a circuit diagram of a modified form.

In some instances, it may be desirable to increase the amount of current available to close the circuit closer over that provided by the arrangement of the circuits shown in Fig. 1, in which event the modified form of the device shown in Fig. 2 may be used. In this arrangement the connections are the same as those previously described, with the exception that the point 24 at the end of resistance 25 is now connected by a wire 30 to one end of the arm 14, with the circuits as shown in Fig. 1, a part of the closing current for the circuit closer is diverted at 24 and flows through resistance 25 to contact 12, but with the modified arrangement all the closing current passes through solenoid 15, since the branch through resistance 25 is now open. This increases the pull of the solenoid and insures that the circuit closer will close promptly. It involves the use of a connection between a fixed and a moving member but this is not objectionable in this instance because only a small maintaining current flows through resistance 25 and a light pigtail 30 may therefore be used.

It will be seen that in the new control mechanism the disadvantages of the former types have been entirely avoided. With the present construction, the main circuit is opened and closed by a circuit closer having a double break and there are no connections carrying heavy currents and extending between fixed and moving parts. The mechanism is controlled through circuits which are protected so that only light currents flow through them, and thus the control switch is not likely to get out of order and its points will last indefinitely as they are not subject to injury due to arcing. Furthermore, in the present construction the circuit which maintains the circuit closer in closed position is established through the main contacts of the circuit closer and not through auxiliary contacts. This maintaining circuit is consequently in series with the main circuit closer contacts, and although the maintaining current is less than the main load current, it is the main load current which passes through the circuit closer and the contacts of the latter may therefore be of the type customarily used in which good electrical contact may be made at all times. Accordingly, there will be no likelihood of fluctuation of the maintaining current and once the main circuit closer is closed it will be held in this position until released by the action of the switch. Repeated operation of the parts or chattering, is thus entirely avoided in this mechanism.

This application is a division of application Ser. No. 48,501, filed August 6, 1925.

I claim:

1. An electric control mechanism for controlling the flow of current from a source of supply to an energy-consuming device, which comprises the combination of an electrically operated circuit closer for making and breaking the circuit through the device, a circuit for closing the circuit closer, a switch for controlling the flow of current through this closing circuit, and a circuit for maintaining the circuit closer in closed position, established through the circuit closer when the latter is closed.

2. An electric control mechanism for controlling the flow of current from a source of supply to an energy-consuming device, which comprises the combination of an electrically operated circuit closer for making and breaking the circuit through the device, a circuit for closing the circuit closer, an automatically operated switch for controlling the flow of current through this closing circuit, and a circuit for maintaining the circuit closer in closed position, established through the circuit closer when the latter is closed.

3. An electric control mechanism for controlling the flow of current from a source of supply to an energy-consuming device, which comprises the combination of an electrically operated circuit closer for making and breaking the circuit through the device, a circuit for closing the circuit closer, a switch for controlling the flow of current through this closing circuit, a second circuit for maintaining the circuit closer in closed position, established through the circuit closer when the latter is closed, and a third circuit under the control of the switch for causing the circuit closer to open.

4. An electric control mechanism for controlling the flow of current from a source of supply to an energy-consuming device, which comprises the combination of an electrically operated circuit closer for making and breaking the circuit through the device, a circuit for closing the circuit closer, a switch for controlling the flow of current through this closing circuit, a second circuit for maintaining the circuit closer in closed position, established through the circuit closer when the latter is closed, and a third circuit under the control of the switch for shunting the circuit closer and causing the latter to open.

5. An electric control mechanism for controlling the flow of current from a source of supply to an energy-consuming device, which comprises the combination of an electrically operated circuit closer for making and breaking the circuit through the device, a circuit in shunt with the circuit closer for closing the latter, a switch for controlling the flow of current through this shunt circuit, and a circuit in series with the circuit closer for maintaining the later closed, this circuit being established when the circuit closer is closed.

6. An electric control mechanism for controlling the flow of current from a source of supply to an energy-consuming device, which comprises the combination of an electrically operated circuit closer for making and breaking the circuit through the device, a circuit in shunt with the circuit closer for closing the latter, a switch for controlling the flow of current through this shunt circuit, a second circuit in series with the circuit closer for maintaining the latter closed, and a third circuit in parallel with the maintaining circuit which, when established, causes the circuit closer to open.

7. An electric control mechanism for controlling the flow of current from a source of supply to an energy-consuming device, which comprises the combination of an electrically operated circuit closer for making and breaking the circuit through the device, a circuit in shunt with the circuit closer for closing the latter, a switch for controlling the flow of current through this shunt circuit, a second circuit in series with the circuit closer for maintaining the latter closed, and a third circuit in parallel with the maintaining circuit which, when established, causes the circuit closer to open, the third circuit being under the control of the switch.

8. An electric control mechanism for controlling the flow of current from a source of supply to an energy-consuming device, which comprises the combination of a solenoid-operated circuit closer for making and breaking the circuit through the device, a circuit through the solenoid for energizing the latter and closing the circuit closer, a switch for controlling this energizing circuit, a second circuit through the circuit closer and solenoid for maintaining the solenoid energized, and a third circuit arranged to shunt the solenoid to cause the circuit closer to open, this third circuit being controlled by the switch.

9. An electric control mechanism for controlling the flow of current from a source of supply to a heating unit which comprises the combination of a circuit closer for making and breaking the circuit through the heating unit, a thermally operated switch responsive to temperature changes produced by the unit, a circuit for closing the circuit closer under the control of the switch and established thereby as the temperature falls to a fixed lower limit, and a circuit through the circuit closer for maintaining the latter closed, independently of the action of the closing circuit.

10. An electric control mechanism for controlling the flow of current from a source of supply to a heating unit which comprises the combination of a circuit closer for making and breaking the circuit through the heating unit, a thermally operated switch responsive to temperature changes produced by the unit, a circuit for closing the circuit closer under the control of the switch and established by the switch as the temperature reaches a predetermined lower limit, a second circuit established through the circuit closer when the latter is closed for maintaining the circuit closer in such position, and a third circuit under the control of the switch for rendering the second circuit ineffective and thereby permitting the circuit closer to open.

11. An electric control mechanism for controlling the flow of current from a source of supply to a heating unit which comprises the combination of a solenoid-operated circuit closer for making and breaking the circuit through the heating unit, a thermal switch responsive to temperature changes produced by the unit, a circuit across the line in parallel with the circuit closer for energizing the solenoid of the latter to cause the circuit closer to close, this circuit being under the control of the switch, and established by the latter when the temperature reaches a predetermined lower limit, and a circuit in series with the circuit closer through the solenoid for maintaining the latter energized when the first circuit is broken by the action of the switch.

12. An electric control mechanism for controlling the flow of current from a source of supply to a heating unit which comprises the combination of a solenoid-operated circuit closer for making and breaking the circuit through the heating unit, a thermally operated switch responsive to temperature changes produced by the unit and comprising a pair of stationary contacts and a movable contact arm disposed between the two, a circuit through the solenoid established when the movable arm engages with one of the contacts for energizing the solenoid to close the circuit closer, this circuit containing a protective resistance, a branch to the line from this circuit in parallel with the solenoid and including a second protective resistance, a second circuit through the circuit closer, the branch circuit, and the solenoid, for maintaining the solenoid energized when the first circuit is broken, and a third circuit established by the engagement of the movable arm of the switch with the second fixed contact thereof and arranged to permit a return of current from the branch circuit to the line without passing through the solenoid whereby the latter is de-energized and the circuit closer is opened.

13. An electric control mechanism for controlling the flow of current from a source of supply to an energy-consuming device, which comprises the combination of an electrically operated circuit closer for making and breaking the circuit through the device, a circuit for closing the circuit closer, a switch for controlling the flow of current through this closing circuit, and a second circuit for maintaining the circuit closer in closed position, established through the circuit closer when the latter is closed, this said second circuit being under the control of the said switch.

14. An electric control mechanism for controlling the flow of current from a source of supply to an energy-consuming device, which comprises the combination of an electrically operated circuit closer for making and breaking the circuit through the device, a circuit for closing the circuit closer, a switch for controlling the flow of current through the closing circuit, and a circuit for maintaining the circuit closer in closed position, established through the circuit closer when the latter is closed, the effectiveness of the said circuit to maintain the circuit closer in closed position being controlled by the said switch.

In testimony whereof I affix my signature.

EDWARD L. FONSECA.